(12) United States Patent
Leber et al.

(10) Patent No.: US 11,713,808 B1
(45) Date of Patent: Aug. 1, 2023

(54) SYSTEMS FOR TRANSMISSION

(71) Applicant: Dana Heavy Vehicle Systems Group, LLC, Maumee, OH (US)

(72) Inventors: Mark W. Leber, Holland, OH (US); Robert L. Vailliencourt, Wauseon, OH (US); Justin Hall, Maumee, OH (US); Langston H. Corn, Sylvania, OH (US); Michael D. Cook, Holland, OH (US); Shane T. Smith, Sylvania, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 17/654,044

(22) Filed: Mar. 8, 2022

(51) Int. Cl.
*F16H 63/32* (2006.01)

(52) U.S. Cl.
CPC ....... *F16H 63/32* (2013.01); *F16H 2063/321* (2013.01); *F16H 2063/322* (2013.01); *F16H 2063/325* (2013.01)

(58) Field of Classification Search
CPC ............. F16H 2063/325; F16H 57/021; F16H 57/031; F16H 2057/0216; F16H 2057/0224; F16H 2063/321
See application file for complete search history.

(56) References Cited

U.S. PATENT DOCUMENTS

| | | | | |
|---|---|---|---|---|
| 2,054,222 | A * | 9/1936 | Lapsley ................. | F16D 41/08 74/343 |
| 4,793,202 | A * | 12/1988 | Okubo .................... | F16H 3/091 74/606 R |
| 5,487,318 | A * | 1/1996 | Schott .................... | F16H 59/70 74/606 R |
| 6,279,423 | B1 * | 8/2001 | Kitajima ............... | F16H 57/021 74/606 R |
| 7,434,488 | B2 | 10/2008 | Tsuji et al. | |
| 9,097,339 | B2 | 8/2015 | Skogward | |
| 2002/0139222 | A1 * | 10/2002 | Blanchard .............. | F16H 63/30 74/606 R |
| 2020/0248794 | A1 * | 8/2020 | Groetzinger ............ | F16H 63/32 |

* cited by examiner

*Primary Examiner* — Jake Cook
*Assistant Examiner* — Gregory T Prather
(74) *Attorney, Agent, or Firm* — McCoy Russell LLP

(57) ABSTRACT

Methods and systems are provided for a transmission housing of a vehicle. In one example, a system comprises a transmission housing comprising at least one cover configured to support a shift fork, wherein the at least one cover is removable from an exterior of the transmission housing.

20 Claims, 5 Drawing Sheets

SYSTEMS FOR TRANSMISSION

FIELD

The present description relates generally to systems for a transmission of an electrified vehicle.

BACKGROUND AND SUMMARY

Vehicles may include a transmission for a controlling power generated by the engine. The transmission may include one or more shafts and gears which may engage or disengage with one another based on a selected gear ratio. One mechanism for engaging and disengaging gears with a shaft is a shift fork.

The shift fork may include a shift linkage configured to mitigate slop/play via the elimination of joints. This may result in a larger fork. Assembly of the larger fork may be more difficult relative to smaller forks due to need for the larger fork to be assembly in the transmission housing at the same time.

In one example, the issues described above may be addressed by a system comprises a transmission that includes a housing and at least one cover configured to support a shift fork, wherein the at least one cover is removable from an exterior of the transmission housing. In this way, components of the at least one cover may be easily replaced without disassembling the transmission and the components therein.

The cover may include one or more bushings configured to support a first pivot point of a shaft of the shift fork. A second cover may be coupled to the housing and configured to support a second pivot point of the shaft of the shift fork. The second pivot point may be at an extreme end of the shift fork opposite the first pivot point. The covers may be configured to support additional shift forks. The covers may be positioned at cut-outs of the housing, wherein the cut-outs may be positioned to allow the shift fork to be positioned within the housing as a single piece. By doing this, an assembly of the transmission housing with the shift forks may be reduced, while reducing the slop/play in the system described above.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
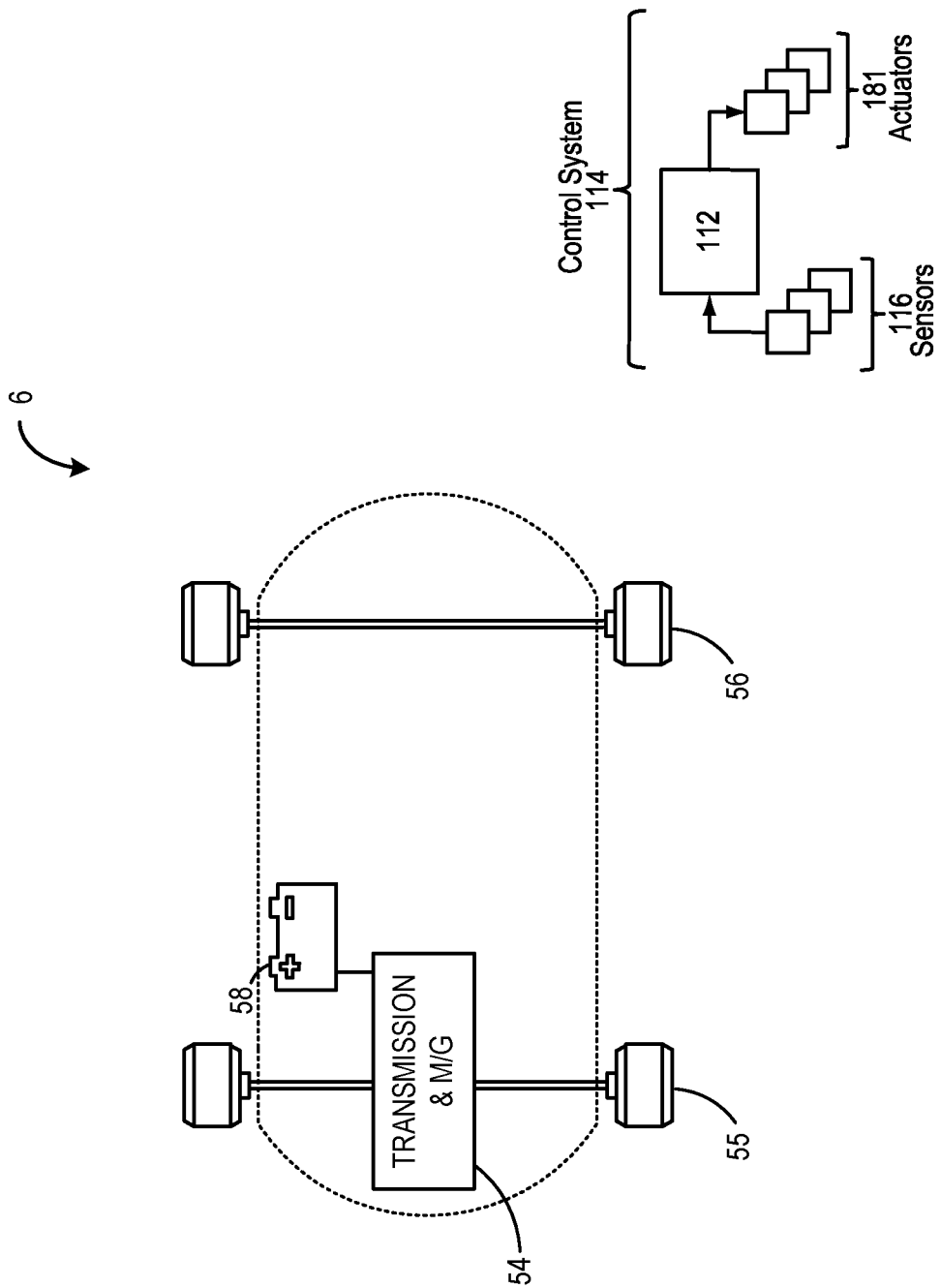
FIG. 1 shows an example of a vehicle system.
Figure 2:
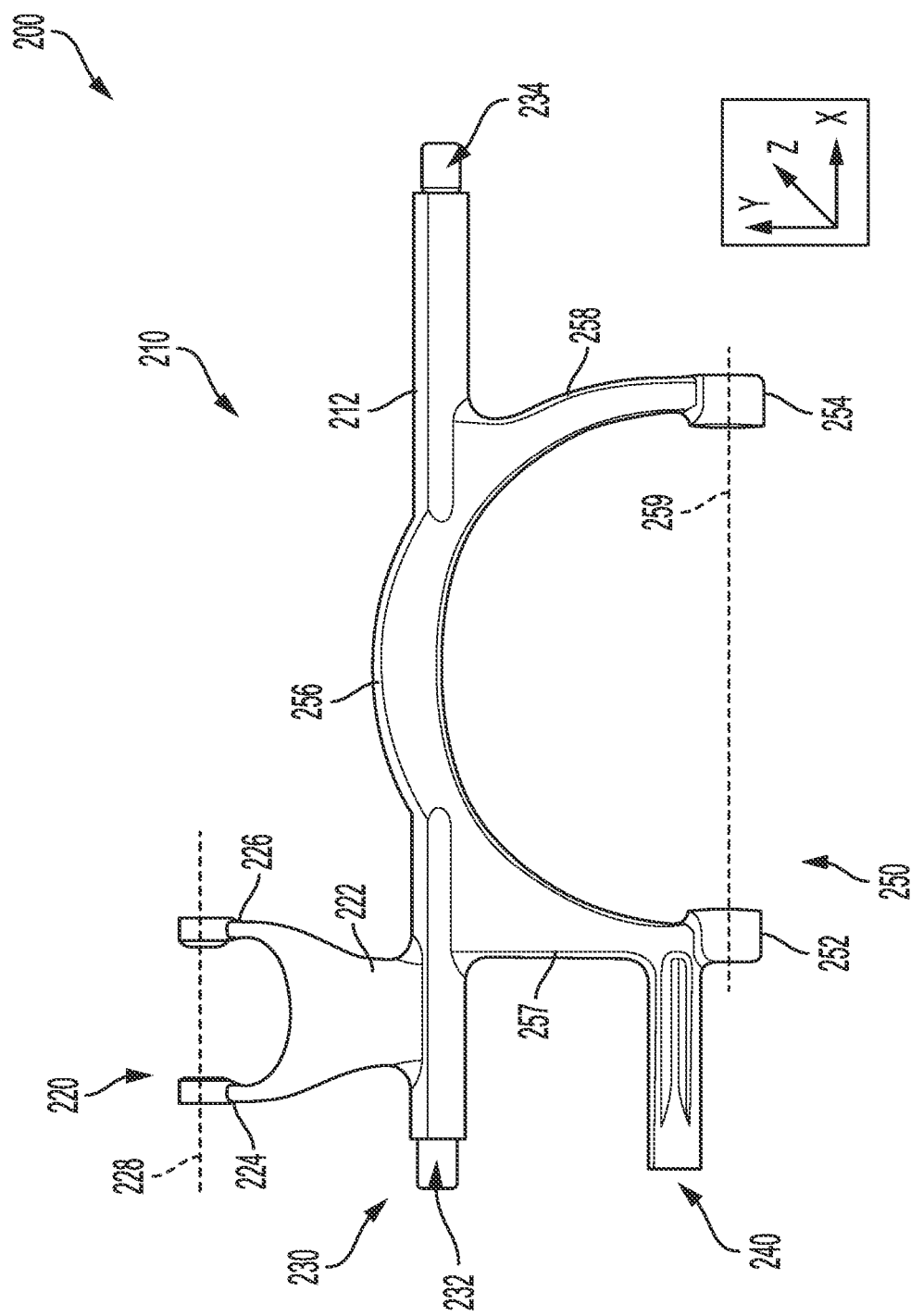
FIG. 2 shows a schematic of a fork.
Figure 3:
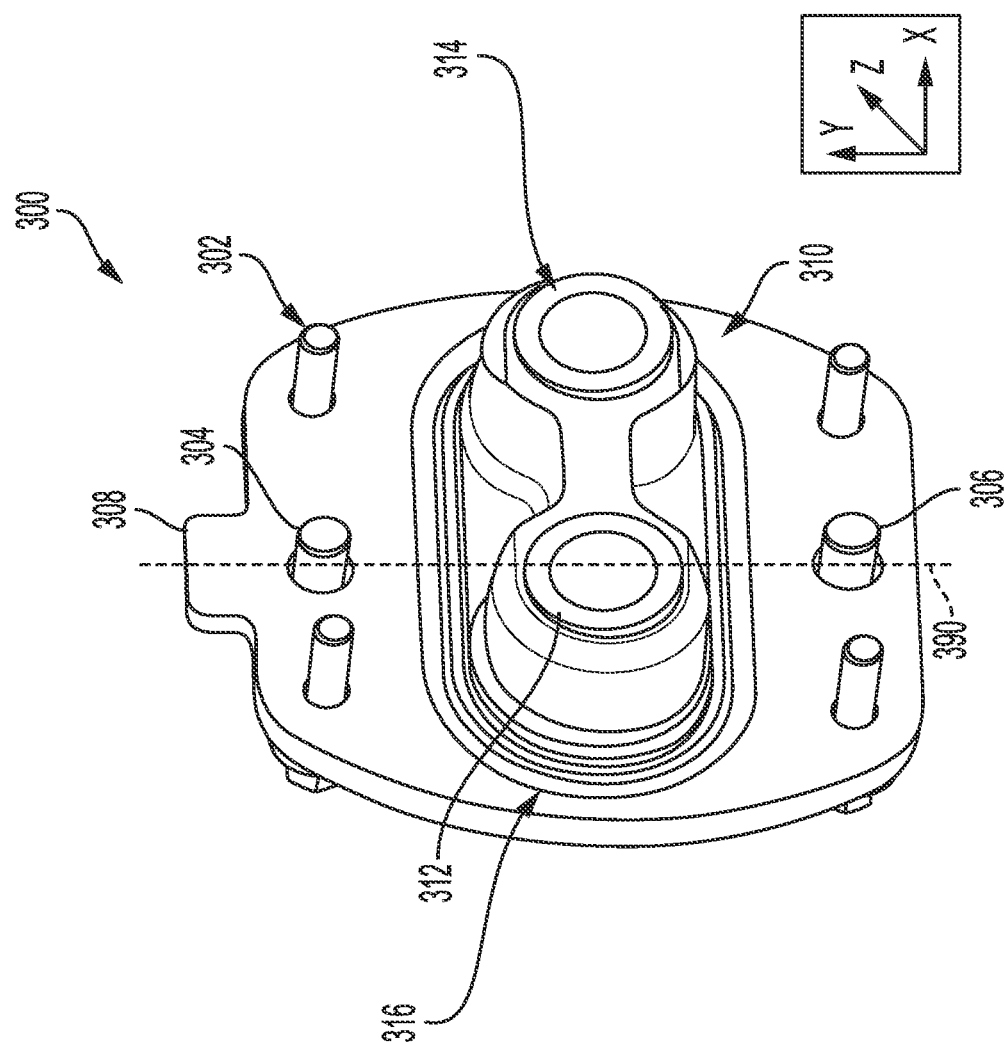
FIG. 3 shows a cover with bushing arranged therein and configured to mate with a transmission housing and the fork.
Figure 4:
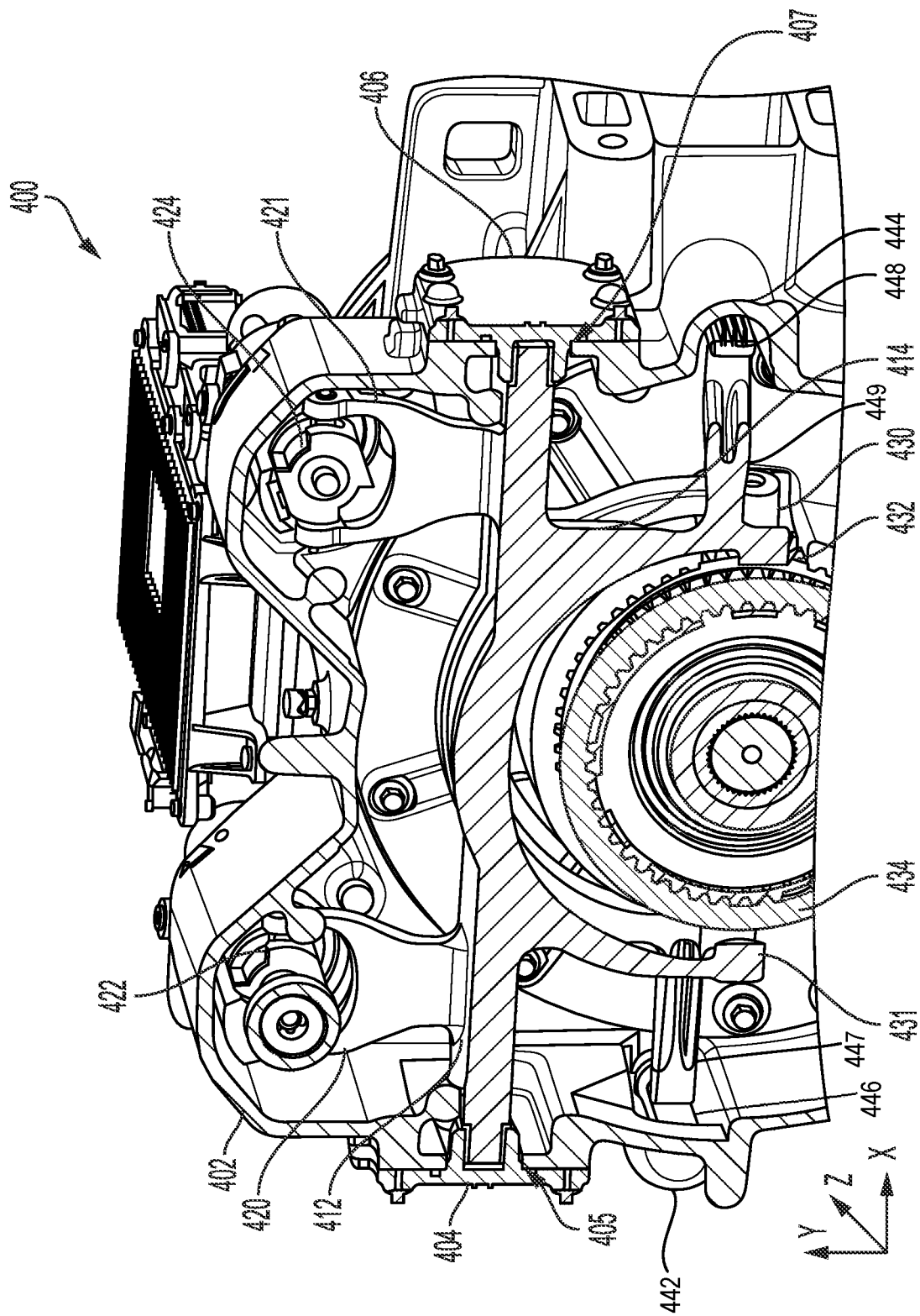
FIG. 4 shows a section view of the fork arranged in the transmission housing and coupled to the cover.
Figure 5:
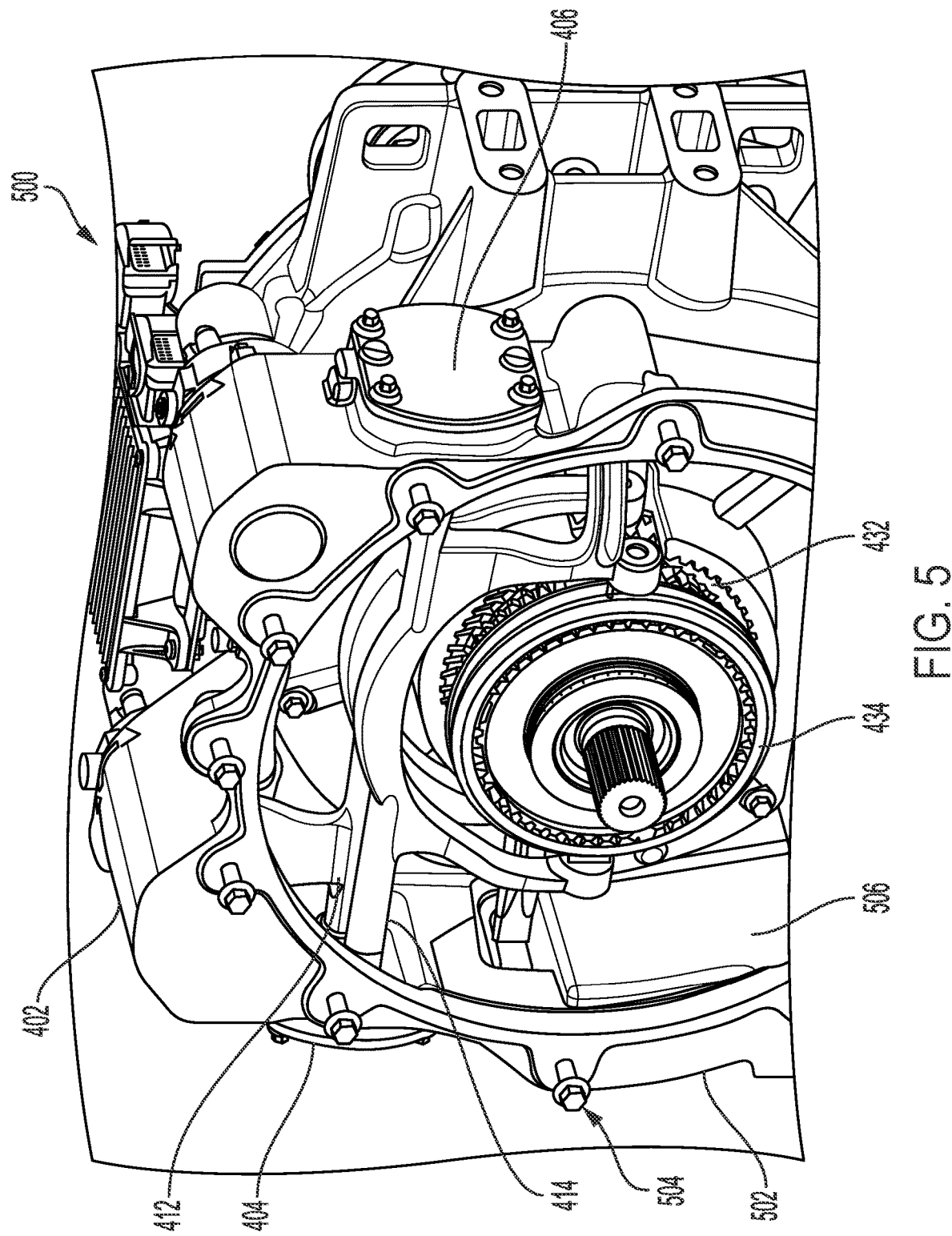
FIG. 5 shows an isometric view of the assembly.

The following description relates to systems for an all-electric or partially electric vehicle, as shown in FIG. 1. The vehicle may include a transmission including a transmission housing, a fork, and a cover. FIG. 2 shows an example of the fork and FIG. 3 shows a cover configured to couple to the transmission housing and the fork. FIG. 4 shows a section view of the fork arranged in the transmission housing. FIG. 5 shows an isometric view of the assembly including the transmission housing, the cover, and the fork.

FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. FIGS. 2-5 are shown approximately to scale, however, other dimensions may be used.

FIG. 1 shows a schematic depiction of a vehicle system 6 that can derive propulsion power from an electric motor/transmission 54. Electric motor 54 receives electrical power from a traction battery 58 to provide torque to rear vehicle wheels 55. Electric motor 54 may also be operated as a generator to provide electrical power to charge traction battery 58, for example, during a braking operation. It should be appreciated that while FIG. 1 depicts an electric motor 54 mounted in a rear wheel drive configuration, other configurations are possible, such as employing electric motor 54 in a front wheel configuration, or in a configuration in which there is an electric motor mounted to both the rear vehicle wheels 55 and front vehicle wheels 56.

Electric motor 54 may include a gearbox integrated therein (to be described further therein). Additionally or alternatively, the electric motor 54 may be coupled to an outside of a transmission/gearbox housing. The integrated gearbox may include a differential and a planetary gear set for transmitting power from the electric motor 54 to the rear vehicle wheels 55. Electric motor 54 may also include at least one clutch. Controller 112 may send a signal to an actuator of the clutch to engage or disengage the clutch, so as to couple or decouple power transmission from the electric motor 54 to the rear vehicle wheels 55 or the front vehicle wheels 56. Additionally or alternatively, there may be multiple traction batteries configured to provide power to different driven wheels, wherein power to the wheels may be predicated based on traction at the wheels, driver demand, and other conditions. In one example, the vehicle system 6 includes an all-wheel drive vehicle system.

Controller 112 may form a portion of a control system 114. Control system 114 is shown receiving information from a plurality of sensors 116 and sending control signals to a plurality of actuators 181. As one example, sensors 116 may include sensors such as a battery level sensor, clutch activation sensor, etc. As another example, the actuators may include the clutch, etc. The controller 112 may receive input data from the various sensors, process the input data, and trigger the actuators in response to the processed input data based on instruction or code programmed therein corresponding to one or more routines.

Turning now to FIG. 2, it shows a schematic of a shift fork 200. In one example, the shift fork 200 is one of a plurality of shift forks. The plurality of shift forks may include exactly two forks. The forks may be arranged in a transmission housing, such as transmission housing of transmission 54 of FIG. 1.

An axis system is shown including three axes, namely an x-axis, a y-axis, and a z-axis. The x-axis may be parallel to a horizontal direction, the y-axis parallel to a vertical axis, and the z-axis normal to each of the x- and y-axes.

The shift fork 200 may be a single piece. The shift fork 200 may include one or more materials including aluminum, steel, carbon fiber, cast iron, or other material. The shift fork 200 may include a body 210. The body 210 may comprise an actuator guide 220, a shaft 230, a position sensor target 240, and a synchro guide 250.

The body 210 may include a tubular section 212 extending in a direction parallel to the x-axis. The tubular section 212 may comprise a circular cross-section taken along a y-z plane. The tubular section 212 may comprise a uniform diameter along its length measured along the x-axis. The shaft 230 may extend through an entire body of the tubular section 212. In one example, pivot points (e.g., extreme ends) of the shaft 230 may protrude beyond a profile of the tubular section. The pivot points may include a first pivot point 232 at a first extreme end of the tubular section 212 and a second pivot point 234 at a second extreme end of the tubular section 212, the second extreme end opposite the first extreme end. In this way, the shaft 230 may be a pivotable shaft.

The actuator guide 220 may be coupled to tubular section 212 at a location proximal to the first pivot point 232. Thus, the actuator guide 220 may be arranged closer to the first pivot point 232 than the second pivot point 234. The actuator guide 220 may comprise a guide body 222. The guide body 222 may extend directly from the tubular section 212 in a direction parallel to the y-axis. The guide body 222 may include a y-shape, wherein the guide body 222 may include a first arm guide 224 and a second arm guide 226. Each of the first arm guide 224 and the second arm guide 226 may include an opening through which an actuator may extend. The opening of each of the first arm guide 224 and the second arm guide 226 may be centered along a common axis 228. The actuator is illustrated in FIG. 4.

The synchro guide 250 may extend from a portion of the tubular section 212 between the first pivot point 232 and the second pivot point 234. The synchro guide 250 may include a horseshoe shape. Additionally or alternatively, the synchro guide 250 may include a C-shape. The synchro guide may include a first synchro guide arm 252 and a second synchro guide arm 254. The first synchro guide arm 252 and the second synchro guide arm 254 may be arranged at opposite extreme ends of the synchro guide. The first synchro guide arm 252 may be arranged at a first extreme end and the second synchro guide arm 254 may be arranged at a second extreme end.

The synchro guide 250 may include an arch 256 that extends from the first synchro guide arm 252 and the second synchro guide arm 254. The arch 256 may extend through the tubular section 212. More specifically, the arch 256 may extend through an entire width of the tubular section 212 measured along the y-axis. The arch 256 may be asymmetric. A first arch arm 257 may include a first triangular cross-sectional shape taken along the x-y plane. A second arch arm 258 may include a second triangular cross-sectional shape taken along the x-y plane. The second triangular cross-sectional shape may be smaller than the first triangular cross-sectional shape. Furthermore, the second arch arm 258 may include a curvature adjacent to the tubular section 212 on a second pivot point 234 side of the tubular section 212. The first arch arm 257 may include a linear portion adjacent to the tubular section 212 on a first pivot point 232 side of the tubular section 212.

The first synchro guide arm 252 and the second synchro guide arm 254 may each include an opening arranged along a common axis 259. A synchro may couple to the openings of the first and second synchro guide arms 252, 254.

The position sensor target 240 may be coupled to the first synchro guide arm 252. The position sensor target 240 may extend from a portion of the first synchro guide arm 252 closer to the opening than to the tubular section 212.

Turning now to FIG. 3, it shows an embodiment of a cover 300. The cover 300 may be configured to facilitate assembly of the fork (e.g., shift fork 200 of FIG. 2). The cover 300 may fit into a window and/or an opening of the transmission housing. In one example, the transmission housing comprises a first cut-out on a first side and a second cut-out on a second side. The cover 300 may sealingly engage with one of the first cut-out or the second cut-out.

The cover 300 may include a plurality of fasteners 302. The plurality of fasteners 302 may be smooth, threaded, or a combination thereof. The plurality of fasteners 302 may couple to a corresponding opening of the housing that may comprise complementary features for engaging with the plurality of fasteners 302.

The cover 300 may further include a first locating element 304 and a second locating element 306. The first locating element 304 may be arranged between an adjacent pair of the plurality of fasteners 302 and the second locating element 306 may be arranged between an adjacent pair of the plurality of fasteners 302. The first locating element 304 and the second locating element 306 may be dowels arranged on along a common axis 390. The first locating element 304 and the second locating element 306 may insert into a corresponding opening of the transmission housing. The cover 300 may hold in place via the locating elements as a user tightens the plurality of fasteners 302. This may simplify a manufacturing process and reduce degradation of the fasteners and the housing. Furthermore, the locating elements may orient the cover 300 to a desired position, wherein the desired position may be based on a desired orientation and location of the shift fork.

The cover 300 may further include a tab 308. The tab 308 may protrude from a body of the cover 300. In one example, the body of the cover 300 may include two linear sides opposite one another and coupled to two curved sides. The tab 308 may extend from one of the two linear sides. In one example, the tab 308 extends from the linear side nearest to the first locating element 304. The plurality of fasteners 302 may be positioned adjacent to corners where the linear sides and the curved sides intersect.

The cover 300 may further include an O-ring 316 configured to seal the opening of the transmission housing. The O-ring 316 may include a compressible material that forms a seal against a surface of the transmission housing when the cover 300 is physically coupled to the transmission housing.

The cover 300 may further include a plurality of bushings 310. The bushings 310 may include a first bushing 312 and a second bushing 314. The plurality of bushings 310 may protrude from the cover 300 into an interior of the transmission housing. The plurality of bushing 310 may be configured to receive the first pivot point or the second pivot point. In one example, the cover 300 may receive a first pivot point of a first shift fork and a second pivot point of a second shift fork. Thus, in one example, the transmission housing may include two covers and two shift forks.

Turning now to FIG. 4, it shows a cross-sectional view 400 of a transmission housing 402 taken in an X-Y plane between an electric motor and the shift forks. A view 500 of the transmission housing 402 with only the electric motor omitted, exposing a transmission housing opening 506 is shown in FIG. 5. The transmission housing 402 may include a first cover 404 and a second cover 406. The first cover 404 is arranged on a first side of the transmission housing 402 and the second cover 406 is arranged on a second side of the transmission housing 402. The first cover 404 and the second cover 406 may be identical to the cover 300 of FIG. 3. The second side may be opposite the first side along the x-axis. A first cut-out 405 may be arranged on the first side and a second cut-out 407 may be arranged on the second side. A distance between the first cut-out 405 and the second cut-out 407 may be equal to or slightly larger than the lengths of the shafts of a first shift fork 412 and a second shift fork 414, which may be identical to the shift fork 210 of FIG. 2. The first cover 404 and the second cover 406 may be removable and accessible from an exterior of the transmission housing 402.

The first cover 404 and the second cover 406 may be coupled to the first shift fork 412 and the second shift fork 414. A first pivot point of the first shift fork 412 may be coupled to a second bushing of the first cover 404 and a second pivot point of the first shift fork 412 may be coupled to a first bushing of the second cover 406. A first pivot point of the second shift fork 414 may be coupled to a second bushing of the second cover 406 and a second pivot point of the second shift fork 414 may be coupled to a first bushing of the first cover 404.

A first actuator 422 is shown coupled to an actuator guide 420 of the first shift fork 412. A second actuator 424 is shown coupled to an actuator guide 421 of the second shift fork 414.

A first synchro 432 is shown coupled to a synchro guide 430 of the first shift fork 412. A second synchro 434 is shown coupled to an actuator guide 431 of the second shift fork 414.

The transmission housing 402 may include two position sensor ports including a first position sensor port 442 and a second position sensor port 444. The first position sensor port 442 may include a first position sensor 446 interfacing with a first position sensor target 447 of the first shift fork 412. The second position sensor port 444 may include a second position sensor 448 interfacing with a second position sensor target 449 of the second shift fork 414.

In the view 500 of FIG. 5, the transmission housing opening 506 is surrounded by a plurality of fasteners 504. The plurality of fasteners 504 may be configured to mount an electric motor to the transmission housing 402. The opening 506 may include a diameter that is less than the length of the shift forks. The diameter may also be less than the distance between the cut-outs arranged in the transmission housing 402 in which the covers are arranged.

In one example, a method of manufacture may include coupling the transmission cover to the transmission housing. A first shift fork may be positioned through the opening of the transmission cover. Pivot points of the first shift fork may be positioned proximally to openings corresponding to where the covers will be positioned. The second shift fork may be positioned through the opening of the transmission cover. Pivots points of the first shift form may be positioned proximally to the openings corresponding where the covers will be positioned. Pivot points of the shift forks may be inserted into bushings of a first cover and the first cover may be positioned to one of the openings and physically coupled to the transmission housing. The pivot points at opposite extreme ends of the shift forks may be inserted into bushings of a second cover. The second cover may then be physically coupled to the transmission housing. By doing this, installation of a large, single piece fork is achieved. Furthermore, installation and replacement of the bushings of the covers may be relatively fast. Additionally, the spacing between the shift forks may allow a single cover to include two bushings configured to support and locate pivot points of the two shift forms. By doing this, both shift forks may be supported by only two covers comprising a total of four bushings. The technical effect of the covers is to allow installation of a large, single piece shift fork into a transmission housing without complicating manufacture procedures.

The disclosure provides support for a system including a transmission housing comprising at least one cover configured to support a shift fork, wherein the at least one cover is removable from an exterior of the transmission housing. A first example of the system includes where the at least one cover is a first cover, the transmission housing further comprising a second cover. A second example of the system, optionally including the first example, further includes where the first cover and the second cover support opposite ends of the shift fork. A third example of the system, optionally including one or more of the previous examples, further includes where the first cover supports a first pivot point of the shift fork via a first bushing and the second cover supports a second pivot point of the shift fork via a second bushing. A fourth example of the system, optionally including one or more of the previous examples, further includes where the shift fork comprises a length greater than a diameter of an opening of a transmission housing. A fifth example of the system, optionally including one or more of the previous examples, further includes where the shift fork is a single piece and comprises a position sensor target.

The disclosure further provides support for a system for a transmission housing of a vehicle including a first shift fork and a second shift fork arranged within the transmission housing, and a first cover arranged at a first side of the transmission housing and a second cover arranged at a second side of the transmission housing, the second side opposite the first, wherein the first cover and the second cover comprise a plurality of bushings to support a shaft of each of the first shift fork and the second shift fork. A first example of the system further includes where the plurality of bushings of the first cover support a first extreme end of the shaft of the first shift fork and a second extreme end of the shaft of the second shift fork. A second example of the system, optionally including the first example, further includes where the plurality of bushings of the second cover support a second extreme end of the shaft of the first shift fork and a first extreme end of the shaft of the second shift fork. A third example of the system, optionally including one or more of the previous examples, further includes where a distance between the first cover and the second cover is greater than a length of the shaft of the first shift fork and the second shift fork. A fourth example of the system, optionally including one or more of the previous examples, further includes where the first cover and the second cover are arranged at openings on the first side and the second side of the transmission housing. A fifth example of the system, optionally including one or more of the previous examples, further includes where an opening in the transmission housing, wherein a diameter of the opening is less than a length of the first shift fork and the second shift fork. A sixth example of the system, optionally including one or more of the previous examples, further includes where the first cover and the second cover comprise a locating element configured to engage with a feature of the transmission housing and retain the first cover and the second cover to the transmission housing without a plurality of fasteners. A seventh example of the system, optionally including one or more of the previous examples, further includes where a first position sensor coupled to a position sensor target of the first shift fork and a second position sensor coupled to a position sensor target of the second shift fork. An eighth example of the system, optionally including one or more of the previous examples, further includes where the first cover and the second cover are identical in size and shape, and wherein the first cover and the second cover are removable and separate from the transmission housing.

The disclosure further provides support for a housing including an opening including a diameter, a first shift fork arranged within the housing, the first shift fork comprising a length greater than the diameter, the length measured along a shaft of the first shift fork, a second shift fork arranged within the housing, the second shift fork comprising a length greater than the diameter, the length measured along a shaft of the second shift fork, and a first cover arranged at a first side opening of the housing and a second cover arranged at a second side opening of the housing, a distance between the first side opening and the second side opening being greater than the length of the shaft of the first shift fork and the second shift fork, wherein the first cover and the second cover comprising a plurality of bushings configured to interface with the shaft of the first shift fork and the second shift fork. A first example of the housing further includes where the first cover is physically coupled to the housing and seals the first side opening, and wherein the second cover is physically coupled to the housing and seals the second side opening. A second example of the housing, optionally including the first example, further includes where the first cover and the second cover are removable, and wherein the plurality of bushings is removed with the first cover and the second cover. A third example of the housing, optionally including one or more of the previous examples, further includes where the first cover and the second cover are physically coupled to the housing via a plurality of fasteners, wherein the plurality of fasteners is accessible from outside of the housing. A fourth example of the housing, optionally including one or more of the previous examples, further includes where the first cover and the second cover comprise one or more locating elements configured to mate with the housing and position the first shift fork and the second shift fork to a desired location.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a transmission that includes a transmission housing and at least one cover configured to pivotally engage with and support a shift fork, wherein the at least one cover is removable from an exterior of the transmission housing, the at least one cover includes a pair of locating elements each of which is insertable into a corresponding feature of the transmission housing, and the at least one cover is removably attached to a window opening cut-out in a side of the transmission housing via a plurality of fasteners spaced about a periphery of the cover, and wherein the at least one cover is sized and arranged so as to sealingly engage with the window opening cut-out in the side of the transmission housing when attached using the plurality of fasteners.

2. The system of claim 1, wherein the at least one cover is a first cover, the transmission housing further comprising a second cover.

3. The system of claim 2, wherein the first cover and the second cover support opposite ends of the shift fork.

4. The system of claim 3, wherein the first cover supports a first pivot point of the shift fork via a first bushing and the second cover supports a second pivot point of the shift fork via a second bushing.

5. The system of claim 1, wherein the shift fork comprises a length greater than a diameter of an opening of a transmission housing.

6. The system of claim 1, wherein the transmission further comprises a position sensor, and wherein the shift fork is a single piece and comprises a position sensor target coupled to the position sensor.

7. A system for a transmission of a vehicle, comprising:
a first shift fork and a second shift fork arranged within a transmission housing of the transmission; and
a first cover arranged at a first side of the transmission housing and a second cover arranged at a second side of the transmission housing, the second side opposite the first side; wherein
the first cover and the second cover each comprise a plurality of bushings to support a shaft of each of the first shift fork and the second shift fork, wherein each of the first cover and the second cover includes a pair of locating elements each of which is insertable into a corresponding feature of the transmission housing, and each of the first cover and the second cover is removably attached to a respective window opening cut-out in a side of the transmission housing via a plurality of fasteners spaced about a periphery of the cover, and wherein each of the first cover and the second cover is sized and arranged so as to sealingly engage with the respective window opening cut-out in the side of the transmission housing when attached using the plurality of fasteners.

8. The system of claim 7, wherein the plurality of bushings of the first cover support a first extreme end of the shaft of the first shift fork and a second extreme end of the shaft of the second shift fork.

9. The system of claim 8, wherein the plurality of bushings of the second cover support a second extreme end of the shaft of the first shift fork and a first extreme end of the shaft of the second shift fork.

10. The system of claim 7, wherein a distance between the first cover and the second cover is greater than a length of the shaft of the first shift fork and the second shift fork.

11. The system of claim 7, wherein the first cover and the second cover are arranged at openings on the first side and the second side of the transmission housing.

12. The system of claim 7, further comprising an opening in the transmission housing, wherein a diameter of the opening is less than a length of the first shift fork and the second shift fork.

13. The system of claim 7, wherein each locating element is configured to retain the first cover or the second cover to the transmission housing without the plurality of fasteners.

14. The system of claim 7, further comprising a first position sensor coupled to a position sensor target of the first shift fork and a second position sensor coupled to a position sensor target of the second shift fork.

15. The system of claim 7, wherein the first cover and the second cover are identical in size and shape, and wherein the first cover and the second cover are removable and separate from the transmission housing.

16. A transmission, comprising:
a housing having an opening therein, with the opening including a diameter;
a first shift fork arranged within the housing, the first shift fork comprising a length greater than the diameter, the length measured along a shaft of the first shift fork;
a second shift fork arranged within the housing, the second shift fork comprising a length greater than the diameter, the length measured along a shaft of the second shift fork; and
a first cover arranged at a first side opening of the housing and a second cover arranged at a second side opening of the housing, a distance between the first side opening and the second side opening being greater than the length of the shaft of the first shift fork and the second shift fork, wherein the first cover and the second cover each comprise a plurality of bushings configured to interface with both the shaft of the first shift fork and the second shift fork, wherein each of the first cover and the second cover includes a pair of locating elements each of which is insertable into a corresponding feature of the housing, and the first cover and the second cover are removably attached, via a plurality of fasteners, to the first side opening and the second side opening, respectively, and wherein each of the first cover and the second cover is sized and arranged so as to sealingly engage with the respective first side and second side openings of the housing when attached using the plurality of fasteners.

17. The transmission of claim 16, wherein the first cover is physically coupled to the housing and seals the first side opening, and wherein the second cover is physically coupled to the housing and seals the second side opening.

18. The transmission of claim 16, wherein the first cover and the second cover are removable, and wherein the plurality of bushings is removed with the first cover and the second cover.

19. The transmission of claim 16, wherein the first cover and the second cover are physically coupled to the housing via a plurality of fasteners, wherein the plurality of fasteners is accessible from outside of the housing.

20. The transmission of claim 16, wherein each locating element is configured to mate with the housing and position the respective first shift fork or the second shift fork to a desired location.

* * * * *